United States Patent [19]
Niino et al.

[11] Patent Number: 5,229,715
[45] Date of Patent: Jul. 20, 1993

[54] VARIABLE RELUCTANCE SENSOR FOR ELECTROMAGNETICALLY SENSING THE RATE OF MOVEMENT OF AN OBJECT

[75] Inventors: Hiroyuki Niino, Asaka; Youichi Taniai, Kawagoe, both of Japan

[73] Assignee: Sanken Airpax Ltd., Tokyo, Japan

[21] Appl. No.: 959,493

[22] Filed: Oct. 9, 1992

Related U.S. Application Data

[63] Continuation of Ser. No. 496,964, Mar. 21, 1990, abandoned.

[30] Foreign Application Priority Data

Apr. 3, 1989 [JP] Japan .................................. 1-85492

[51] Int. Cl.$^5$ ............................ G01B 7/15; G01P 3/48; G01P 3/54
[52] U.S. Cl. ........................... 324/207.15; 324/207.13; 324/207.25; 324/174
[58] Field of Search ................. 324/173, 174, 207.11, 324/207.13, 207.15, 207.22, 207.25

[56] References Cited

U.S. PATENT DOCUMENTS

| | | | |
|---|---|---|---|
| 3,041,483 | 6/1962 | Ebbinghaus et al. | 324/174 |
| 3,469,662 | 9/1969 | Dewar | 324/174 |
| 3,961,214 | 6/1976 | Lokkart | 324/174 |

FOREIGN PATENT DOCUMENTS 60-9722 4/1985 Japan .

*Primary Examiner*—Walter E. Snow
*Attorney, Agent, or Firm*—Woodcock, Washburn, Kurtz, Mackiewicz & Norris

[57] ABSTRACT

A variable reluctance sensor is disclosed as adapted for sensing the rate of revolution of a toothed wheel of magnetic material. The sensor has at least two magnets disposed side by side. One of the magnet has a first pole (e.g. S pole) disposed opposite the toothed wheel, and the other magnet has a second pole (e.g. N pole) disposed opposite the toothed wheel. The second pole of the first mentioned magnet and the first pole of the second magnet are both held against a magnetic core around which a coil is wound. As the teeth of the magnetic wheel successively travel past the magnets, they create magnetic fluxes oriented in opposite directions, which counteract each other in the core. Consequently, the total magnetic flux in the magnetic member varies more greatly than heretofore depending upon whether each magnet is opposed to any one tooth, or to the space between any two neighboring teeth, of the magnetic wheel. Such great variations in magnetic flux are translated into a correspondingly large amplitude signal as by the coil around the core.

10 Claims, 4 Drawing Sheets

$2D = D' = P$

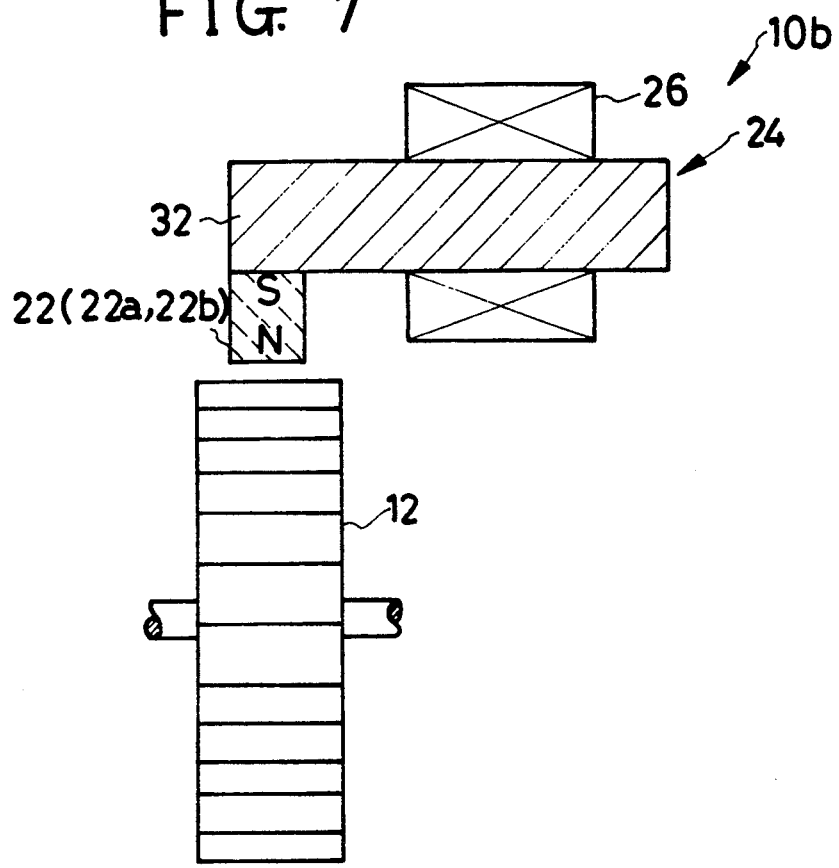
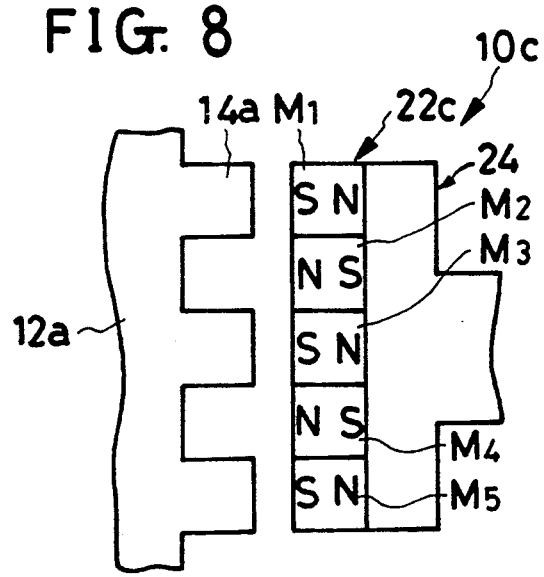

VARIABLE RELUCTANCE SENSOR FOR ELECTROMAGNETICALLY SENSING THE RATE OF MOVEMENT OF AN OBJECT

This is a continuation of application Ser. No. 496,964, filed Mar. 21, 1990, now abandoned.

BACKGROUND OF THE INVENTION

Our invention relates generally to sensors, and particularly to a device for electromagnetically sensing the rate of movement of an angularly or linearly movable member from variations in reluctance. The sensing device of our invention lends itself to use as the primary detector of a revolution counter on a motor vehicle, although we do not wish our invention to be limited to this particular application.

The electromagnetic revolution sensor has been known and used extensively on motor vehicles. It provides an electric signal indicative of the revolutions of a toothed wheel of magnetic material which rotates at a rate corresponding to the speed of travel of the motor vehicle.

Japanese Utility Model Publication No. 60-9722, dated Apr. 5, 1985, represents a familiar example of revolution sensor. This prior art device comprises a permanent magnet held opposite the toothed magnetic wheel, a magnetic core attached to the magnet, and a coil of wire wound around the core via a bobbin. The permanent magnet, the magnetic core and the toothed magnetic wheel constitute in combination a magnetic circuit. The reluctance of the magnetic circuit varies as the teeth of the magnetic wheel travel past the permanent magnet. The consequent changes in the magnetic flux of the circuit cause corresponding variations in the voltage induced in the coil. Thus the coil provides a variable voltage signal representative of the rate of rotation of the toothed wheel.

Our objection to this and other comparable prior art devices is that their sensitivities are not so high as can be desired. By the term "sensitivity" we mean the difference in signal magnitude (i.e. amplitude) when the teeth of the magnetic wheel are opposed to the magnet and when the spacings between the teeth are. The greater the amplitude, the higher the sensitivity. The low sensitivities of the conventional devices have required the use of sensitive, and therefore expensive, electric circuits for processing their output signals.

SUMMARY OF THE INVENTION

We have hereby invented how to improve the sensitivity of the variable reluctance sensor.

Briefly, our invention may be summarized as a variable reluctance sensor of improved sensitivity for sensing the rate of movement of a movable object having a series of teeth of magnetic material which are spaced apart from each other with a constant pitch. The sensing device comprises permanent magnet means having at least a first and a second pair of a first (e.g. S) and a second (e.g. N) magnetic pole of opposite nature. The first pole of the first pair and the second pole of the second pair are both to be held opposite the movable object. The positions of the two pairs of poles with respect to the movable object are such that the first pole of the first pair lies opposite one tooth of the movable object when the second pole of the second pair lies opposite the spacing between two adjoining teeth of the movable object, and vice versa. Disposed opposite the second pole of the first pair and the first pole of the second pair is a magnetic member for carrying a variable magnetic flux that is produced as the magnetic teeth of the movable object successively travel past the permanent magnet means. The magnetic member is associated with magnetoelectric means for producing an electric signal representative of the variable magnetic flux in the magnetic member.

Perhaps the most pronounced feature of our invention resides in the provision of at least two pairs of magnetic poles of opposite character, or at least two discrete permanent magnets, disposed side by side and in opposite polarity along the path of travel of the magnetic teeth of the movable object such as a toothed wheel. As the magnetic teeth successively travel past the permanent magnet means, the two pole pairs or magnets create magnetic fluxes in opposite directions, which counteract each other in the magnetic member.

Consequently, the total magnetic flux in the magnetic member varies far more greatly than heretofore depending upon whether each pole pair or magnet is opposed to any one tooth, or to the space between any two neighboring teeth, of the movable object. Such great variations in magnetic flux can be translated into a correspondingly large amplitude signal as by a coil wound around the magnetic member.

The above and other features and advantages of our invention and the manner of realizing them will become more apparent, and the invention itself will best be understood, from a study of the following description and appended claims, with reference had to the attached drawings showing some preferable embodiments of our invention.

BRIEF DESCRIPTION OF THE DRAWINGS

FIG. 7 is a schematic diagram of a further preferred form of revolution sensor embodying the principles of our invention; and FIG. 8 is a partial schematic diagram showing the variable reluctance sensor of our invention as adapted for sensing the rate of linear movement.

DESCRIPTION OF THE PREFERRED EMBODIMENTS

Figure 1:
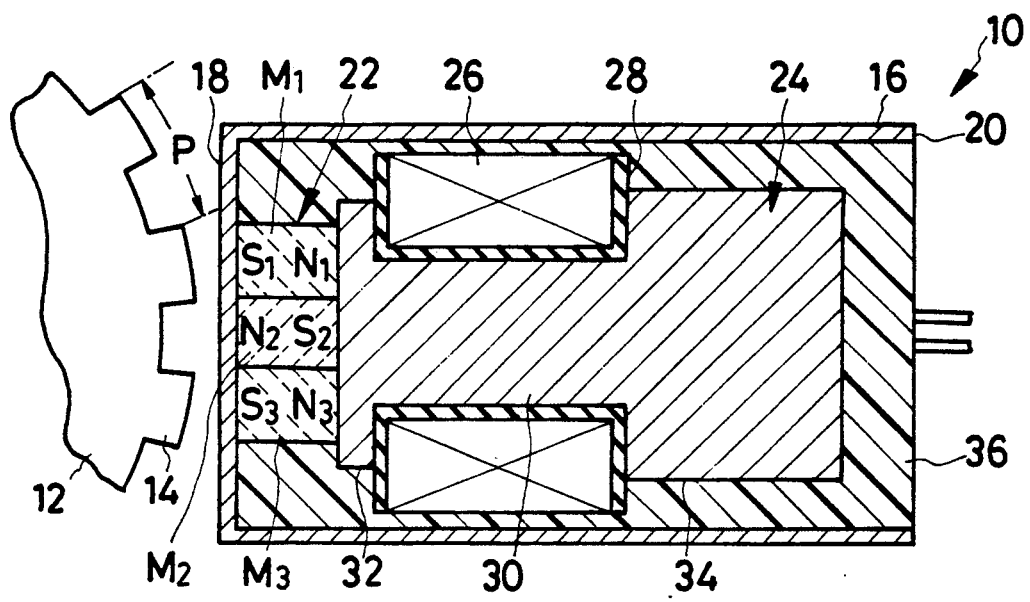
FIG. 1 is an axial section through the variable reluctance sensor embodying the principles of our invention, the variable reluctance sensor being shown adapted for use as a revolution sensor for sensing the rate of revolution of a toothed magnetic wheel which is also shown fragmentarily in this figure.
Figure 2:
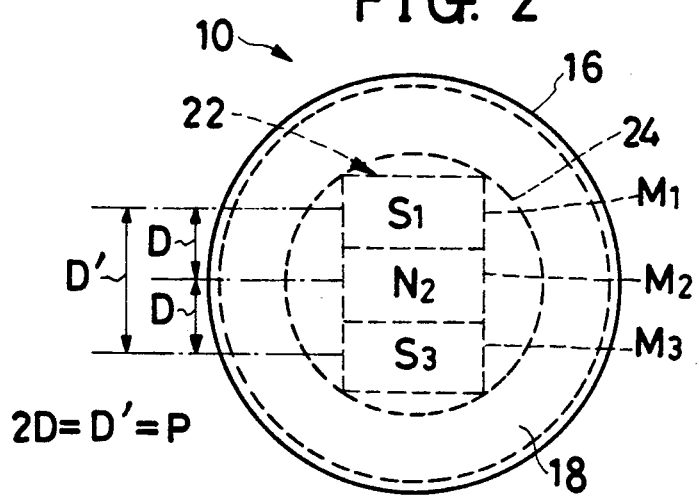
FIG. 2 is a left hand end elevation of the revolution sensor of FIG. 1.

We will now describe the variable reluctance sensor of our invention in detail in terms of the revolution sensor illustrated in FIGS. 1 and 2 and therein generally designated 10. In FIG. 1 we have shown the revolution sensor 10 together with part of a wheel 12 of magnetic material having a series of teeth 14 formed thereon with a prescribed pitch P. This magnetic wheel 12 represents an example of movable object whose revolution is to be detected from variations in reluctance and translated into corresponding voltage variations by the revolution sensor 10.

The revolution sensor 10 includes a tubular enclosure 16 of nonmagnetic material having a closed front end 18 and an open rear end 20. The closed front end 18 of the enclosure 16 is disposed opposite the toothed periphery of the magnetic wheel 12 with a spacing therebetween.

Mounted within the enclosure 16 is a permanent magnet assembly 22 which is held against the closed front end 18 of the enclosure. The permanent magnet assembly 22 of this particular embodiment comprises three permanent magnets $M_1$, $M_2$ and $M_3$ arranged in a row in the diametric direction of the tubular enclosure 16 and in the plane of rotation of the magnetic wheel 12.

It is essential according to our invention that the first and third magnets $M_1$ and $M_3$ have their poles of the same character oriented toward the magnetic wheel 12, and the second magnet $M_2$ have its pole of the opposite character oriented toward the magnetic wheel. Thus, in this particular embodiment, the S poles $S_1$ and $S_3$ of the first and third magnets $M_1$ and $M_3$, and the N pole $N_2$ of the second magnet $M_2$, are shown held against the closed front end 18 of the enclosure 16. The N poles $N_1$ and $N_3$ of the first and third magnets $M_1$ and $M_3$ and the S pole $S_2$ of the second magnet $M_2$ are oriented away from the magnetic wheel 12.

It is also important that the center to center distances between the three magnets $M_1$-$M_3$ be predetermined as follows in relation to the pitch P of the teeth 14 of the magnetic wheel 12. Our invention requires that the first and third magnets $M_1$ and $M_3$ be each opposed to a different tooth 14 of the magnetic wheel 12 when the second magnet $M_2$ is opposed to the spacing between any two adjoining teeth of the wheel, and that the first and third magnets be each opposed to the spacing between two adjoining teeth when the second magnet is opposed to one tooth. Toward this end the center to center distance D between the first and second magnets $M_1$ and $M_2$ is made equal to that between the second and third magnets $M_2$ and $M_3$. Further, in this particular embodiment, each distance D is equal to one half of the pitch P of the teeth 14, so that the center to center distance D' between the first and third magnets $M_1$ and $M_3$ is equal to the pitch P. Therefore, in this embodiment, $D = P/2$ $D' = P.$ Speaking more broadly, however, the distance D' can be an integral multiple of the pitch P for the fulfillment of the above requirement of our invention. Thus, according to the broader aspect of our invention, $D = P/2 + nP$ $D' = mP$ where n is a positive integer or zero, and m is a positive integer.

Also mounted within the enclosure 16 and disposed behind the permanent magnet assembly 22 is a member 24 of magnetic material for carrying variable magnetic flux that is produced as the teeth 14 of the magnetic wheel 12 successively travel past the permanent magnet assembly. We have shown the magnetic member 24 as a core around which a coil of wire 26 is wound via a bobbin 28. Substantially cylindrical in shape, the magnetic core 24 has a midportion 30 having the coil 26 wound thereon, a front end portion 32 of greater diameter held against the permanent magnet assembly 22, and a rear end portion 34 of still greater diameter. The front end portion 32 of the magnetic core 24 is in contact with the N poles $N_1$ and $N_3$ of the first and third magnets $M_1$ and $M_3$ and with the S pole $S_2$ of the second magnet $M_2$.

The permanent magnet assembly 22, the magnetic core 24 and the coil 26 are retained in positions within the enclosure 16 by a filler 36 of nonmagnetic, electrically insulating material, preferably a plastic. The filler 36 serves also to make the revolution sensor 10 impervious to fluids.

Operation

The revolution sensor 10 of the foregoing construction senses the rotation of the toothed magnetic wheel 12 from variations in magnetic flux in the magnetic core 10 of the coil 26. We have illustrated in FIGS. 3 and 4 how the magnetic flux varies in the magnetic core 10 with the rotation of the toothed wheel 12.

Figure 3:
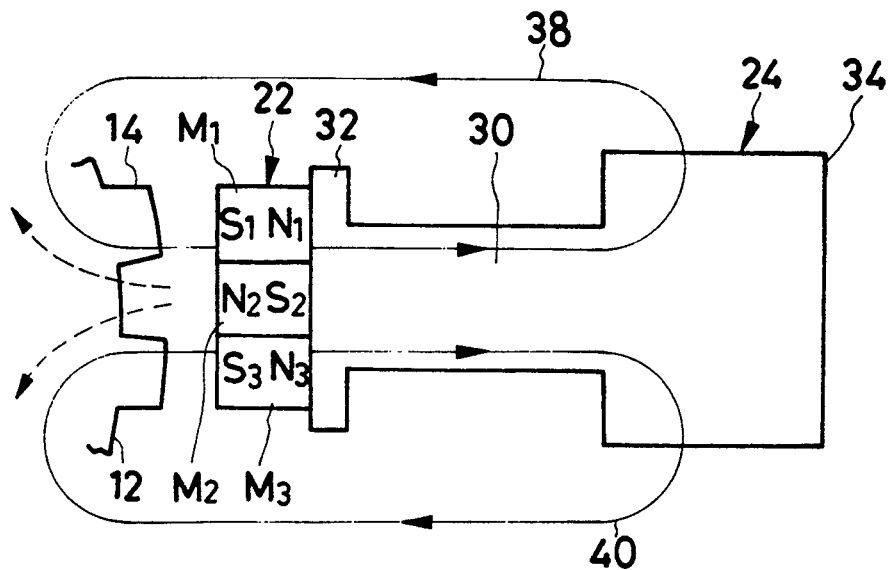
FIG. 3 is a schematic diagram explanatory of the paths of magnetic flux when the first and third magnets of the revolution sensor are opposed to the teeth of the magnetic wheel.

FIG. 3 shows the magnetic wheel 12 in such an angular position that its two neighboring teeth 14 are opposed to the first and third magnets $M_1$ and $M_3$, and the spacing between these teeth is opposed to the second magnet $M_2$. It will be seen that the magnetic wheel 12, the permanent magnet assembly 22 and the magnetic core 24 constitute in combination a magnetic circuit of variable reluctance. Opposed to the first and third magnets $M_1$ and $M_3$ as in FIG. 3, the two teeth 14 of the magnetic wheel 12 shown here serve to provide paths 38 and 40 of less reluctance for the magnetic fluxes due to the first and third magnets than the path for the magnetic flux due to the second magnet $M_2$, the latter being now opposed to the spacing between the two illustrated teeth 14.

Let $\phi_1$, $\phi_2$ and $\phi_3$ be the individual magnetic fluxes produced by the three magnets $M_1$, $M_2$ and $M_3$ at the midportion 30 of the magnetic core 24. Then the total magnetic flux $\phi$ at the midportion 30 of the magnetic core 24 can be expressed as $$\phi = \phi_1 - \phi_2 + \phi_3.$$

Assume that the three magnets $M_1$, $M_2$ and $M_3$ are of the same strength. Since the path for the flux $\phi_2$ due to the second magnet $M_2$ is of relatively high reluctance when the magnetic wheel 12 is in the angular position of FIG. 3, $\phi_2$ is less than each of $\phi_1$ and $\phi_3$. Consequently, the total magnetic flux $\phi$ at the midportion 30 of the magnetic core 24 is greater than if all the magnets $M_1$, $M_2$ and $M_3$ were opposed to the different teeth, or the same tooth, of the magnetic wheel 12.

Figure 4:
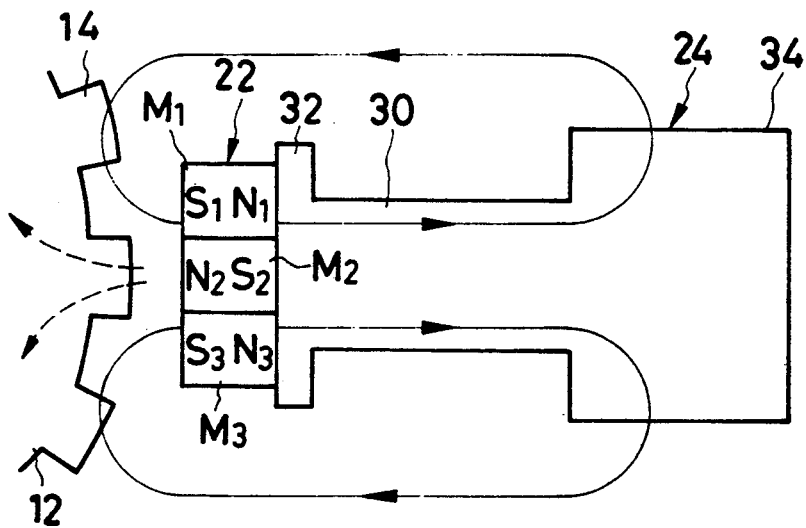
FIG. 4 is a diagram similar to FIG. 3 except that only the second magnet of the revolution sensor is opposed to one of the teeth of the magnetic wheel.
Figure 5:
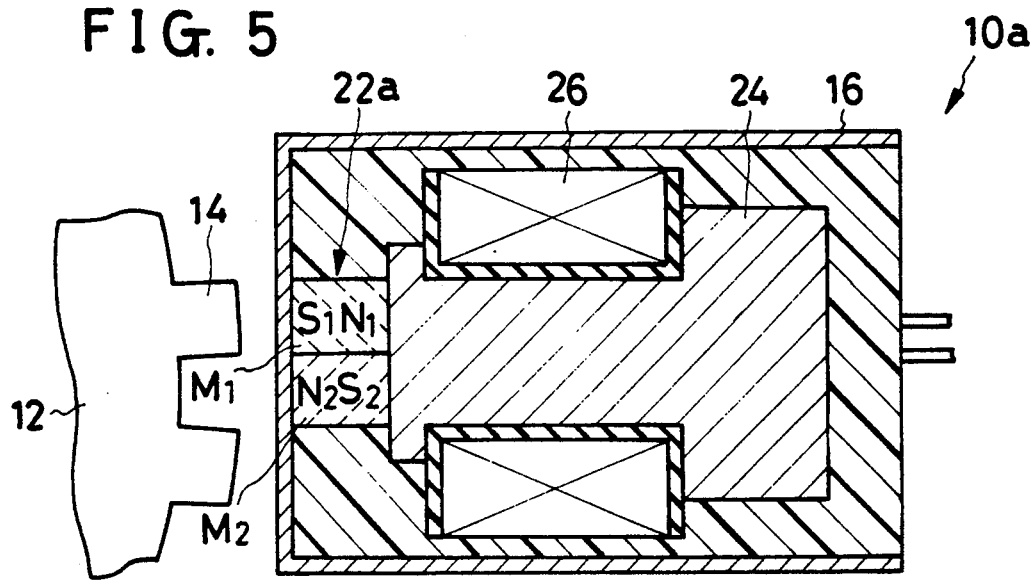
FIG. 5 is a view similar to FIG. 1 but showing another preferred form of revolution sensor embodying the principles of our invention.

In FIG. 4 is shown the magnetic wheel 12 in such an angular position that one of its teeth 14 is opposed to the second magnet $M_2$, and the spaces on its opposite sides are opposed to the first and third magnets $M_1$ and $M_3$. In this case, as will be understood from the foregoing explanation of FIG. 3, the fluxes $\phi_1$ and $\phi_3$ due to the first and third magnets $M_1$ and $M_3$ are each less than the flux $\phi_2$ due to the second magnet $M_2$. The total magnetic flux $\phi$ at the midportion 30 of the core 24 is therefore much less than that when the magnetic wheel 12 is in the angular position of FIG. 3.

The rotation of the magnetic wheel 12 with respect to the revolution sensor 10 is, essentially, the repetition of its two angular positions depicted in FIGS. 3 and 4. Accordingly, the above discussed difference in $\phi$ when the magnetic wheel 12 is in these angular positions is tantamount to the difference between the maximum and minimum values of the voltage cyclically induced in the coil 26 during the rotation of the magnetic wheel 12.

We have previously defined this difference between the maximum and minimum values of the sensor output voltage as the sensitivity of the variable reluctance sensor. It will therefore be understood that the increased difference in $\phi$ when the magnetic wheel 12 is in the positions of FIGS. 3 and 4 leads to the higher sensitivity of the revolution sensor 10 according to our invention. Thus the revolution sensor 10 makes it possible to more accurately detect the rate of revolution of the magnetic wheel 12, or to use less expensive equipment for shaping, amplifying, and otherwise processing the sensor output signal, than heretofore.

Second Form

The alternate revolution sensor 10a represents the simplest embodiment of our invention in having but two permanent magnets $M_1$ and $M_2$ as a permanent magnet assembly 22a. The first magnet $M_1$ is shown to have its S pole $S_1$ disposed opposite the magnetic wheel 12 and its N pole $N_1$ against the core 24. The second magnet $M_2$ is shown to have its N pole $N_2$ disposed opposite the magnetic wheel 12 and its S pole $S_2$ against the core 24. The center to center distance between the two magnets $M_1$ and $M_2$ should preferably be equal to half the pitch of the teeth 14 on the magnetic wheel 12. The other details of construction of this revolution sensor 10a can be identical with those of the FIGS. 1 and 2 sensor 10.

In operation, the first magnet $M_1$ is opposed to one of the teeth 14 of the magnetic wheel 12 when the second magnet $M_2$ is opteeth 14 of the magnetic wheel 12 when the second magnet $M_2$ is opposed to one of the spaces on both sides of that tooth, and vice versa. It will therefore be understood from the foregoing description of FIGS. 3 and 4 that this revolution sensor 10a can also detect the rate of rotation of the magnetic wheel 12 much more sensitively than if only one magnet were provided in place of the two magnets $M_1$ and $M_2$ or if the two magnets were disposed in the same polarity.

Third Form

Figure 6:
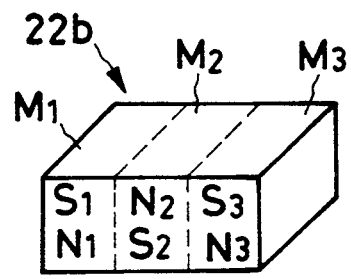
FIG. 6 is a perspective view of a modified permanent magnet assembly that can be used in the revolution sensor of FIG. 1 or 5.

FIG. 6 shows another modified permanent magnet assembly 22b which takes the form of a single block of magnetizable material permanently magnetized to possess three pairs $M_1$, $M_2$ and $M_3$ of poles of opposite nature in a row. The second pole pair $M_2$ is in opposite polarity to the first and third pole pairs $M_1$ and $M_3$. Used in place of the permanent magnet assembly 22 of the FIGS. 1 and 2 sensor 10, the modified magnet assembly 22b will make it easier of assemblage.

Fourth Form

Still another modified revolution sensor 10b shown schematically in FIG. 7 represents a different arrangement of the core 24 with respect to the magnetic wheel 12. It will be seen that the core 24, with the coil 26 wound thereon, generally extends parallel to the axis of rotation of the magnetic wheel 12. The permanent magnet assembly 22 (or 22a or 22b) is attached to one side of the front end portion 32 of the core 24 and so is disposed opposite the toothed periphery of the magnetic wheel 12. We recommend this arrangement in applications where a sufficient space for the installation of the complete revolution sensor is not available in the radial direction of the magnetic wheel 12.

Fifth Form

The variable reluctance sensor of our invention is applicable for the detection of not only the rate of revolution, as in the foregoing embodiments, but also the rate of linear movement. Thus, in FIG. 8, we have shown a linearly movable member 12a of magnetic material having a series of teeth 14a formed thereon with a predetermined pitch.

Although the rate of movement of the linearly movable member 12a may be sensed by any of the sensors 10, 10a and 10b disclosed in the foregoing, we have shown in FIG. 8 another modified sensor 10c together with the linearly movable member 12a. The modified sensor 10c features a permanent magnet assembly 22c having five permanent magnets (or five magnetized pole pairs of a single piece of magnetizable material) $M_1$–$M_5$. The five illustrated magnets $M_1$–$M_5$ are all attached to the magnetic core 24 and arranged in a row in the direction of movement of the linearly movable member 12a. The first, third and fifth magnets $M_1$, $M_3$ and $M_5$ are shown to have their S poles oriented toward the movable member 12a whereas the second and fourth magnets $M_2$ and $M_4$ are shown to have their N poles oriented toward the movable member. In short, according to our invention, the permanent magnet assembly can be constituted of any number of magnets, or discretely magnetized pairs of poles of opposite nature, not less than two.

Possible Modifications

Despite the foregoing detailed disclosure we do not wish our invention to be limited by the exact details of the illustrated embodiments. The following, then, is a brief list of possible modifications or alterations of the foregoing embodiments which we believe all fall within the scope of our invention:

1. Magnets of different strengths could be employed as the permanent magnet assembly.

2. The individual magnets of the permanent magnet assembly could be magnetically isolated from one another, either with intervening gaps or with intervening members of suitable material, or by the staggered arrangement of the magnets.

3. The magnets of the permanent magnet assembly could be of other than the rectangular shape.

4. A member or members of magnetic material could be disposed on the front end of the permanent magnet assembly.

5. Magnetoelectric converter means such as a Hall effect element could be employed in place of the coil for providing an electric signal representative of the variations in magnetic flux caused by the movement of the toothed wheel or other movable member.

6. Not all but only the teeth of the movable member could be made of magnetic material.

7. The permanent magnet assembly could be disposed out of contact with the magnetic core or with an equivalent magnetic member for carrying magnetic flux.

What we claim is:

1. A variable reluctance sensor apparatus comprising:

(a) a movable member (12) having a series of teeth (14) which are spaced apart from each other with a constant pitch, at least the teeth of the movable member being a magnetic material;

(b) permanent magnet means (22) comprising a first and a second pair ($M_1$, $M_2$) of a first and a second magnetic pole of opposite nature, the first pole ($S_1$) of the first pair ($M_1$) and the second pole ($N_2$) of the second pair ($M_2$) being both disposed opposite the movable member (12), the positions of the two pairs ($M_1$, $M_2$) of poles with respect to the teeth (14) of the movable member being such that the first pole ($S_1$) of the first pair ($M_1$) is opposed to one tooth (14) of the movable member when the second pole ($N_2$) of the second pair ($M_2$) is opposed to the spacing between two adjoining teeth of the movable member, and vice versa;

(c) a magnetic member having a single midportion (30), a single front end portion (32) and a single rear end portion (34), the front end portion being disposed opposite the second pole ($N_1$) of the first pair ($M_1$) and the first pole ($S_2$) of the second pair ($M_2$) in order to carry a variable magnetic flux that is produced by said first and second pairs as the magnetic teeth of the movable member successively travel past the permanent magnet means (22), and (d) a coil wound around the midportion to produce a signal representative of the entire flux in the midportion at a given instant of time.

2. The variable reluctance sensor of claim 1 wherein the center to center distance D between the first and second pairs of poles of the permanent magnet means is defined as $$D = P/2 + nP$$

where
P = pitch of the magnetic teeth of the moveable object
n = positive integer or zero.

3. The variable reluctance sensor of claim 1 wherein the permanent magnet means comprises a first magnet having the first pair of poles, and a second magnet having the second pair of poles.

4. The variable reluctance sensor of claim 1 wherein the permanent magnet means comprises a single magnet having the first and second pairs of poles.

5. The variable reluctance sensor of claim 1 wherein the permanent magnet means comprises a third pair of a first and a second magnetic pole of opposite nature, the first pole of the third pair being adapted to be held opposite the movable object, the second pole of the third pair being held opposite the magnetic member, the third pair of poles being so positioned with respect to the teeth of the movable object that the first poles of the first and third pair are both opposed to two different teeth of the movable object when the second pole of the second pair is opposed to the spacing between two adjoining teeth of the movable object, and that the first poles of the first and third pair are each opposed to the spacing between two adjoining teeth of the movable object when the second pole of the second pair is opposed to one tooth of the movable object.

6. The variable reluctance sensor of claim 5 wherein the center to center distance D' between the first and third pairs of poles of the permanent magnet means is defined as $$D' = mP$$

where
P = pitch of the magnetic teeth of the movable object, and
m = positive integer.

7. The variable reluctance sensor of claim 5 wherein the permanent magnet means comprises a first magnet having the first pair of poles, a second magnet having the second pair of poles, and a third magnet having the third pair of poles.

8. The variable reluctance sensor of claim 5 wherein the permanent magnet means comprises a single magnet having the first, second and third pairs of poles.

9. The variable reluctance sensor apparatus of claim 1 wherein the movable member is a toothed wheel, and wherein the magnetic member comprises a core generally extending radially of the toothed wheel.

10. The variable reluctance sensor apparatus of claim 1 wherein the movable member is a toothed wheel having an axis of rotation, and wherein the magnetic member comprises a core generally extending parallel to the axis of rotation of the toothed wheel.

* * * * *